(12) United States Patent
De Spiegeleer et al.

(10) Patent No.: US 9,823,870 B2
(45) Date of Patent: Nov. 21, 2017

(54) DISTRIBUTED OBJECT STORAGE SYSTEM COMPRISING LOW POWER STORAGE NODES

(71) Applicant: AMPLIDATA NV, Lochristi (BE)

(72) Inventors: Kristof Mark Guy De Spiegeleer, Gent (BE); Wim De Wispelaere, Gent (BE)

(73) Assignee: Amplidata NV, Lochristi (BE)

( * ) Notice: Subject to any disclaimer, the term of this patent is extended or adjusted under 35 U.S.C. 154(b) by 0 days.

(21) Appl. No.: 14/990,667

(22) Filed: Jan. 7, 2016

(65) Prior Publication Data

US 2016/0117126 A1    Apr. 28, 2016

Related U.S. Application Data

(63) Continuation of application No. 13/976,055, filed as application No. PCT/EP2011/074080 on Dec. 27, 2011, now Pat. No. 9,535,621.

(60) Provisional application No. 61/427,325, filed on Dec. 27, 2010.

(51) Int. Cl.
| | |
|---|---|
| *G06F 19/00* | (2011.01) |
| *G06F 3/06* | (2006.01) |
| *G06F 11/30* | (2006.01) |
| *G06F 1/20* | (2006.01) |

(52) U.S. Cl.
CPC ............ *G06F 3/0625* (2013.01); *G06F 1/206* (2013.01); *G06F 3/0619* (2013.01); *G06F 3/0665* (2013.01); *G06F 3/0689* (2013.01); *G06F 11/3034* (2013.01); *G06F 11/3058* (2013.01)

(58) Field of Classification Search
USPC ......................................................... 711/114
See application file for complete search history.

(56) References Cited

U.S. PATENT DOCUMENTS

| | | | |
|---|---|---|---|
| 6,292,905 B1 | 9/2001 | Wallach | |
| 7,146,521 B1 | 12/2006 | Nguyen | |
| 7,536,693 B1 | 5/2009 | Manczak | |
| 7,577,767 B1* | 8/2009 | Robillard | G06F 1/206 324/161 |
| 7,778,972 B1 | 8/2010 | Cormie | |
| 7,962,779 B2 | 6/2011 | Patel | |
| 2002/0078244 A1* | 6/2002 | Howard | G06F 17/30227 709/248 |
| 2006/0173956 A1 | 8/2006 | Ulrich | |
| 2009/0234613 A1* | 9/2009 | Brey | G01B 21/00 702/130 |

(Continued)

OTHER PUBLICATIONS

European Extended Search Report for EP15191910, dated Mar. 9, 2016, 6 pages.

*Primary Examiner* — Kidest Bahta
(74) *Attorney, Agent, or Firm* — Patent Law Works LLP

(57) ABSTRACT

A storage node for a distributed object storage system, comprising a control board configured to receive a parameter for setting predetermined allowable temperature ranges through a serial port, and sending a signal through said serial port for indicating one or more of said measurements of temperatures lies outside said predetermined allowable ranges. The control board is further configured to receive a parameter for controlling the switching on or off the storage elements through said serial port by sending a signal through said serial port to indicate which storage elements is switched on or off.

20 Claims, 6 Drawing Sheets

(56) References Cited

U.S. PATENT DOCUMENTS

2011/0138395 A1\* 6/2011 Wolfe ................ G06F 1/206
              718/105
2012/0071076 A1\* 3/2012 Wei ................ H05K 7/1497
              454/184

\* cited by examiner

DISTRIBUTED OBJECT STORAGE SYSTEM COMPRISING LOW POWER STORAGE NODES

CROSS-REFERENCE TO RELATED APPLICATIONS

This application is a continuation of and claims priority to U.S. application Ser. No. 13/976,055, filed Jul. 8, 2013, titled "A Distributed Object Storage System Comprising Low Power Storage Nodes," which is the National Stage of International Application No. PCT/EP11/74080 filed Dec. 27, 2011, titled "A Distributed Object Storage System Comprising Low Power Storage Nodes," which claims benefit to U.S. Provisional Application No. 61/427,325, filed Dec. 27, 2010, titled "Low Power Storage Node for Cloud Storage Systems," each of which is incorporated by reference herein in its entirety.

FIELD OF THE INVENTION

The present invention generally relates a distributed data storage systems. Typically, such distributed storage systems are targeted at storing large amounts of data, such as objects or files in a distributed and fault tolerant manner with a predetermined level of redundancy. The present invention relates more particularly to a distributed object storage system.

BACKGROUND

The advantages of object storage systems, which store data objects referenced by an object identifier versus file systems, such as for example US2002/0078244, which store files referenced by an inode or block based systems which store data blocks referenced by a block address in terms of scalability and flexibility are well known. Object storage systems in this way are able to surpass the maximum limits for storage capacity of file systems in a flexible way such that for example storage capacity can be added or removed in function of the needs, without degrading its performance as the system grows. This makes such object storage systems excellent candidates for large scale storage systems.

Such large scale storage systems are required to distribute the stored data objects in the object storage system over multiple storage elements, such as for example hard disks, or multiple components such as storage nodes comprising a plurality of such storage elements. However as the number of storage elements in such a distributed object storage system increase, equally the probability of failure of one or more of these storage elements increases. To cope therewith it is required to introduce a level of redundancy into the distributed object storage system. This means that the distributed object storage system must be able to cope with a failure of one or more storage elements without data loss. In its simplest form redundancy is achieved by replication, this means storing multiple copies of a data object on multiple storage elements of the distributed object storage system. In this way when one of the storage elements storing a copy of the data object fails, this data object can still be recovered from another storage element holding a copy. Several schemes for replication are known in the art, in general replication is costly as the storage capacity is concerned. This means that in order to survive two concurrent failures of a storage element of a distributed object storage system, at least two replica copies for each data object are required, which results in storage capacity overhead of 200%, which means that for storing 1 GB of data objects a storage capacity of 3 GB is required. Another well-known scheme is referred to as RAID systems of which some implementations are more efficient than replication as storage capacity overhead is concerned. However, often RAID systems require a form of synchronisation of the different storage elements and require them to be of the same type and in the case of drive failure require immediate replacement, followed by a costly and time consuming rebuild process. Therefor known systems based on replication or known RAID systems are generally not configured to survive more than two concurrent storage element failures. Therefor it has been proposed to use distributed object storage systems that are based on erasure encoding, such as for example described in WO2009135630O or US2007/0136525. Such a distributed object storage system stores the data object in encoded sub blocks that are spread amongst the storage elements in such a way that for example a concurrent failure of six storage elements can be tolerated with a corresponding storage overhead of 60%, that means that 1 GB of data objects only require a storage capacity of 1.6 GB.

In order to reduce power consumption and increase reliability of the distributed object storage system, some form of monitoring of the hardware is required. In prior art systems some central monitoring facility will periodically connect to the storage elements and request status information such as fan speeds, temperature, disk error rates etc. The central facility will then analyse all this data and try to determine if certain actions are to be taken like proactively replication of data of a storage element that is about to fail. However for very large and distributed object storage systems this approach does not scale well and the time it would take to poll all of the storage elements would lead to a very low monitoring frequency.

SUMMARY OF THE INVENTION

According to the invention there is provided a storage node for a distributed object storage system, said storage node comprising:
  A power supply;
  A plurality of redundant storage elements powered by said power supply;
  A motherboard powered by said power supply and connected to said at least one storage element comprising:
    At least one CPU;
    At least one network interface for transporting data to said storage elements;
    A serial port configured for providing access to a serial console; and
  At least one fan,
  CHARACTERIZED IN THAT said storage node further comprises:
    a control board for connecting said serial port to a serial bus; and
    at least one temperature sensor coupled to said control board;
    at least one fan coupled to said control board;
    said control board being configured to:
      receive a parameter for setting one or more predetermined allowable temperature ranges through said serial port; and
      send a signal through said serial port for indicating that one or more of said measurements of temperatures lies outside said predetermined allowable temperature ranges; and control the speed of said at least one fan on the basis of measurements from said temperature sensors such that these measurements of temperatures remain within said predetermined allowable temperature ranges.

Traditional computer systems are managed through a KVM (Keyboard, Video an Mouse) system, that allows to remotely take over Keyboard, Video and Mouse. The implementation of such remote control system requires three connections on each computer to be connected to a central KVM device. This is a complex and expensive solution. The control board of the storage node according to the invention eliminates the need for such a KVM and is able to automatically control the hardware of the storage node in such a way that the power consumption can be minimized and reliability can be improved even when the motherboard is powered down or the operating system of the storage node is unavailable. This all is accomplished in a scalable way as the control board allows for low latency control in the storage node while the control node is able to modify the parameters controlling the operation of this control board and receive signals informing it about their operational status.

According to a preferred embodiment said storage node further comprising an incoming serial connector and an outgoing serial connector connected to said control board for daisy chaining said multiple storage nodes via said serial bus.

This enables a scalable setup with simple wiring requirements, which in large scale systems becomes increasingly important.

According to a preferred embodiment said plurality of temperature sensors are arranged:
  on each of said storage elements; and/or
  at an air inlet of said storage node as an inlet temperature sensor, and at an air outlet of said storage node as an outlet temperature sensor, said outlet temperature sensor being positioned in the vicinity of said CPU.

In this way the temperature measurements can be used to regulate and direct the airflow more efficiently to the specific areas in the storage node where it is needed in order to limit power consumption.

According to a preferred embodiment said plurality of temperature sensors are coupled to said control board by means of a single digital bus configured to power said temperature sensors and to transfer the temperature measurements to said control board. This setup allows a simpler wiring implementation inside the storage node, which frees up space for the other components and reduces its disturbance of the air flow.

According to a further embodiment said control board is further operable to monitor the speed of said at least one fan, and said control board is further configured to:
  receive a parameter for setting one or more predetermined allowable fan speed ranges through said serial port; and
  send a signal through said serial port for indicating that one or more of said fan speed measurements lies outside said predetermined allowable fan speed ranges.

This allows the fan control to happen with low latency and low overhead and even at times when the motherboard or the operating system of the storage node are unavailable, which allows to still further reduce power consumption.

According to still a further embodiment:
  said a power supply is configurable to switch each of said storage elements on or off individually, said power supply being connected to said control board; and
  said control board being configured to:
    receive a parameter for controlling the switching on or off of said storage elements through said serial port; and
    send a signal through said serial port for indicating which of said storage elements is switched on or off.

Optionally said parameter for controlling the switching on or off of said storage elements configures said control board to instruct said power supply to execute the powering up of said storage elements sequentially or said parameter for controlling the switching on or off of said storage elements configures said control board to instruct said power supply to execute the powering up or down of said storage elements in function of said temperature measurements and said allowable temperature ranges.

This allows to reduce the power requirements for the power supply which can then operate in an operating mode that is more efficient and as such results in a lower power usage of the storage node and further allows to reduce power consumption of low usage storage elements or to extend the life span of highly loaded storage elements.

According to a further aspect of the invention there is provided a distributed object storage system comprising a plurality of storage nodes according to any of the preceding claims, comprising:
  a plurality of redundant storage elements, operable to store and retrieve a data object comprising a data object identifier in the form of a predetermined number of redundant sub blocks comprising said data object identifier, said predetermined number corresponding to a predetermined multiple of a desired spreading width, wherein said desired spreading width consists of the sum of:
    a minimal spreading requirement, corresponding to the minimal number of storage elements that must store sub blocks of said data object and are not allowed to fail; and
    a maximal concurrent failures tolerance, corresponding to the number of storage elements that must store sub blocks of said data object and are allowed to fail concurrently;
  each one of said redundant sub blocks comprising:
    encoded data of equal size of the data object divided by a factor equal to said predetermined multiple of said minimal spreading requirement; and
    decoding data, such that said data object can be decoded from any combination of said redundant sub blocks of which the number corresponds to predetermined multiple of said minimal spreading requirement.
  at least one controller node, operably connected to or comprised within said storage nodes when storing or retrieving said data object, comprising:
    an encoding module operable to disassemble said data object into said predetermined number of redundant sub blocks;
    a spreading module operable to store said predetermined number of said redundant sub blocks on a number of said storage elements larger or equal to said desired spreading width;
    a clustering module operable to retrieve at least said predetermined multiple of said minimal spreading requirement of said redundant sub blocks from a plurality of said storage elements; and
    a decoding module operable to assemble said data object from any combination of said redundant sub blocks of which the number corresponds to said predetermined multiple of said minimal spreading requirement,

CHARACTERISED IN THAT

Said controller node is operably connected to said storage nodes by means of said serial bus to:
send said parameter for setting said predetermined allowable temperature ranges; and
receive said signals for indicating that one or more of said measurements of temperatures lies outside said predetermined allowable temperature ranges;

Preferably said controller node is further operably connected to said storage nodes by means of said serial bus to:
send said parameter for setting one or more predetermined allowable fan speed ranges; and
receive said signal for indicating that one or more of said fan speed measurements lies outside said predetermined allowable fan speed ranges.

Preferably said controller node is further operably connected to said storage nodes by means of said serial bus to:
send said parameter for controlling the switching on or off of said storage elements; and
receive said signal for indicating which of said storage elements is switched on or off.

This allows for a scalable approach for the distributed object storage system that is able to limit its power consumption and extend its operational life and reliability.

According to a further embodiment said spreading module is configured to control continuation or discontinuation of usage of one or more of said storage elements on the basis of:
said signals for indicating that one or more of said measurements of temperatures lies outside said predetermined allowable temperature ranges; and/or
said signals for indicating which of said storage elements is switched on or off.

This allows for the distributed object storage system that to limit its power consumption and extend its operational efficiency by for example discontinuing use of storage elements that are causing high amounts of heat or from switching back on storage elements for only a short period of time.

According to still a further embodiment said spreading module is further configured to adapt the selection of said storage elements in order to distribute storage load across said storage elements on the basis of:
said signals for indicating that one or more of said measurements of temperatures lies outside said predetermined allowable ranges; and/or
said signals for indicating which of said storage elements is switched on or off.

In this way an intelligent use of the spreading policy by the spreading module on the basis of the information provided by the control boards allows to reduce power consumption and increase reliability of the distributed object storage system.

DETAILED DESCRIPTION

Figure 1:
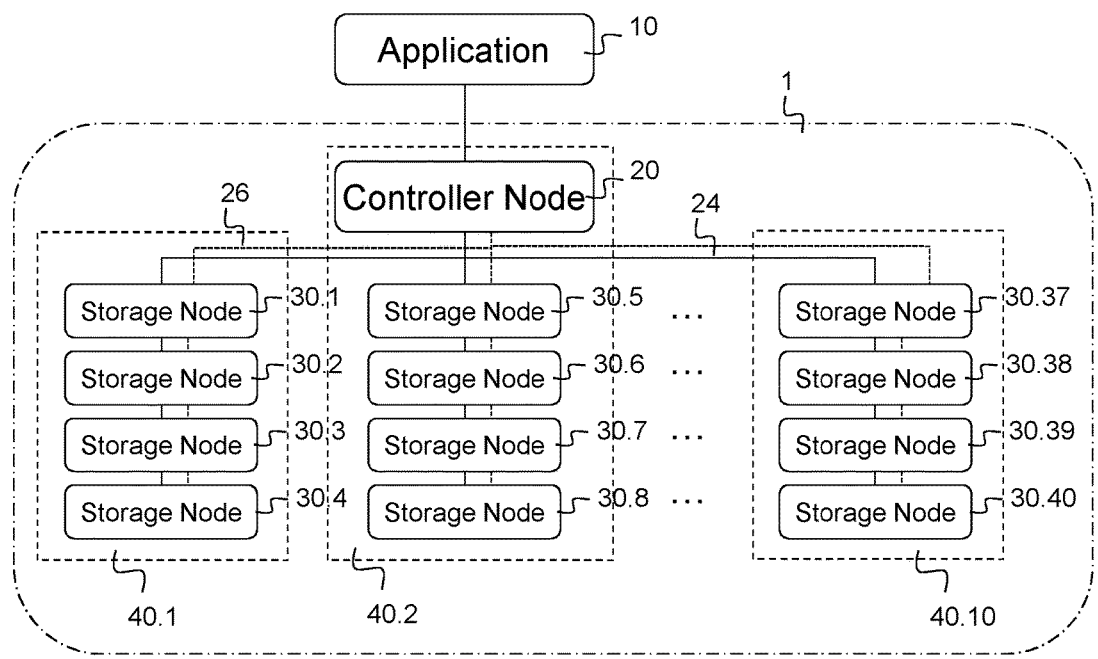
FIG. 1 illustrates a distributed object storage system according to the invention.

FIG. 1 shows a distributed object storage system 1 according to the invention. It is connected to an application 10 for transferring data objects. This connection could be implemented as a suitable data communication network. Such an application could for example be a dedicated software application running on a computing device, such as a personal computer, a lap top, a wireless telephone, a personal digital assistant or any other type of communication device, that is able to interface directly with the distributed object storage system 1, but said application 10 could alternatively comprise a suitable file system which enables a general purpose software application to interface with the distributed object storage system 1 or an Application Programming Interface library. As further shown in FIG. 1 the distributed object storage system comprises a controller node 20 and a plurality of storage nodes 30.1-30.40 all interconnected in a suitable way for transferring data, for example by means of a conventional data communication network 24 such as a local area network (LAN), a wide area network (WAN), a telephone network, such as the Public Switched Telephone Network (PSTN), an intranet, the internet, any other suitable network or combination of networks. Controller nodes 20, storage nodes 30 and the device comprising application 10 may connect to said data communication network by wired, wireless and/or optical connections. As will be explained further below, especially with reference to FIGS. 7 and 8 the controller nodes 20 are further connected by means of a serial bus 26.

According to alternative embodiments of the distributed object storage system could comprise any other suitable number of storage nodes 30 and for example two three or more controller nodes 20 also connected to these storage nodes 20. These controller nodes 20 and storage nodes 30 can be built as general purpose computers, however more frequently they are physically adapted for arrangement in large data centres, where they are arranged in modular racks 40 comprising standard dimensions. Particular controller nodes 20 and storage nodes 30, such as for example the Amplistor AS20 storage node as manufactured by Amplidata, are dimensioned to take up a single unit of such rack 40, which is generally referred to as 1 U.

As shown in FIG. 1 several storage nodes 30 can be grouped together, for example because they are housed in a single rack 40. For example storage nodes 30.1-30.4; 30.5-30.8; . . . ; and 30.7-30.40 each are respectively grouped into racks 40.1, 40.2, . . . 40.10. Controller node 20 could for example be located in rack 40.2. These racks are not required to be located at the same location, they are often geographically dispersed across different data centres, such as for example rack 40.1-40.3 can be located at a data centre in Europe, 40.4-40.7 at a data centre in the USA and 40.8-40.10 at a data centre in China.

Figure 2:
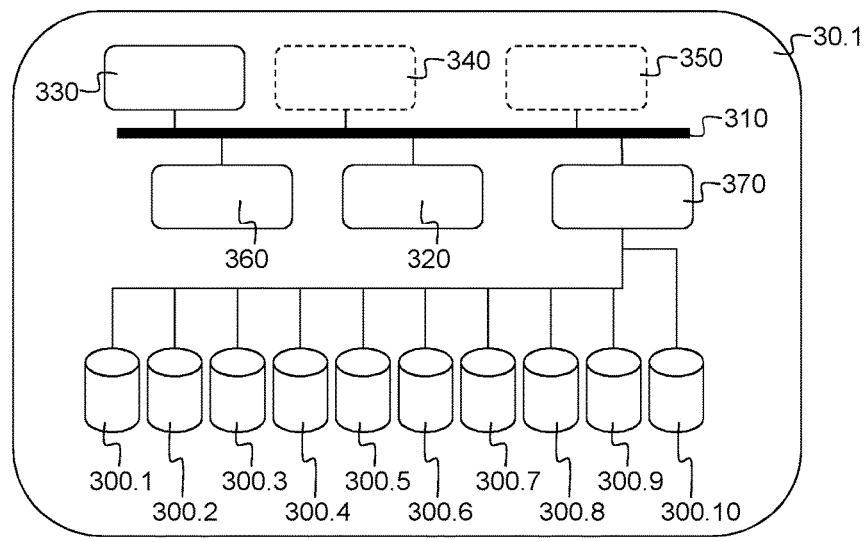
FIG. 2 schematically illustrates a storage node of the distributed object storage system of FIG. 1.

FIG. 2 shows a schematic representation of one of the storage nodes 30. Storage node 30.1 may comprise a bus 310, a processor 320, a local memory 330, one or more optional input units 340, one or more optional output units 350, a communication interface 360, a storage element interface 370 and a plurality of storage elements 300.1-300.10. Bus 310 may include one or more conductors that permit communication among the components of storage node 30.1. Processor 320 may include any type of conventional processor or microprocessor that interprets and executes instructions. Local memory 330 may include a random access memory (RAM) or another type of dynamic storage device that stores information and instructions for execution by processor 320 and/or a read only memory (ROM) or another type of static storage device that stores static information and instructions for use by processor 320. Input unit 340 may include one or more conventional mechanisms that permit an operator to input information to said storage node 30.1, such as a keyboard, a mouse, a pen, voice recognition and/or biometric mechanisms, etc. Output unit 350 may include one or more conventional mechanisms that output information to the operator, such as a display, a printer, a speaker, etc. Communication interface 360 may include any transceiver-like mechanism that enables storage node 30.1 to communicate with other devices and/or systems, for example mechanisms for communicating with other storage nodes 30 or controller nodes 20 such as for example two 1 Gb Ethernet interfaces. Storage element interface 370 may comprise a storage interface such as for example a Serial Advanced Technology Attachment (SATA) interface or a Small Computer System Interface (SCSI) for connecting bus 310 to one or more storage elements 300, such as one or more local disks, for 2 TB SATA-II disk drives, and control the reading and writing of data to/from these storage elements 300. In one exemplary embodiment as shown in FIG. 2, such a storage node 30.1 could comprise ten 2 TB SATA-II disk drives as storage elements 300.1-300.10 and in this way storage node 30.1 would provide a storage capacity of 20 TB to the distributed object storage system 1. According to the exemplary embodiment of FIG. 1 and in the event that storage nodes 30.2-30.40 are identical to storage node 30.1, the distributed object storages system 1 would then have a total storage capacity of 800 TB.

Taking into account FIGS. 1 and 2 the distributed object storage system 1 comprises a plurality of redundant storage elements 300. The storage nodes 30 each comprise a share of these storage elements 300. As shown in FIG. 1 storage node 30.1 comprises ten storage elements 300.1-300.10. Other storage nodes 30 could comprise a similar amount of storage elements, but this is however not essential. Storage node 30.2 could for example comprise eight storage elements 300.11-300.18. As will be explained in further detail below with respect to FIGS. 5 and 6, the distributed object storages system 1 is operable to store and retrieve a data object 500 comprising data 520, for example 64 MB of binary data and a data object identifier 510 for addressing this data object 500, for example a universally unique identifier such as a globally unique identifier (GUID). Storing the data offered for storage by the application 10 in the form of a data object, also referred to as object storage, has specific advantages over other storage schemes such as conventional block based storage or conventional file based storage, such as scalability and flexibility, which are of particular importance in a distributed object storage system 1 that is directed to large scale redundant storage applications, sometimes also referred to as cloud storage.

The storage elements 300 are redundant and operate independently of one another. This means that if one particular storage element 300 fails its function can easily be taken on by another storage element 300 in the distributed storage system. However as will be explained in more detail further below, there is no need for the storage elements 300 to work in synchronism, as is for example the case in many well-known RAID configurations, which sometimes even require disc spindle rotation to be synchronised. Furthermore the independent and redundant operation of the storage elements 300 allows to use any suitable mix of types storage elements 300 to be used in a particular distributed object storage system 1. It is possible to use for example storage elements with differing storage capacity, storage elements of differing manufacturers, using different hardware technology such as for example conventional hard disks and solid state storage elements, using different storage interfaces such as for example different revisions of SATA, PATA and so on. All this results in specific advantages for scalability and flexibility of the distributed object storage system 1 as it allows to add or remove storage elements 300 without imposing specific requirements to their design in correlation to other storage elements 300 already in use in that distributed object storage system 1.

Figure 3:
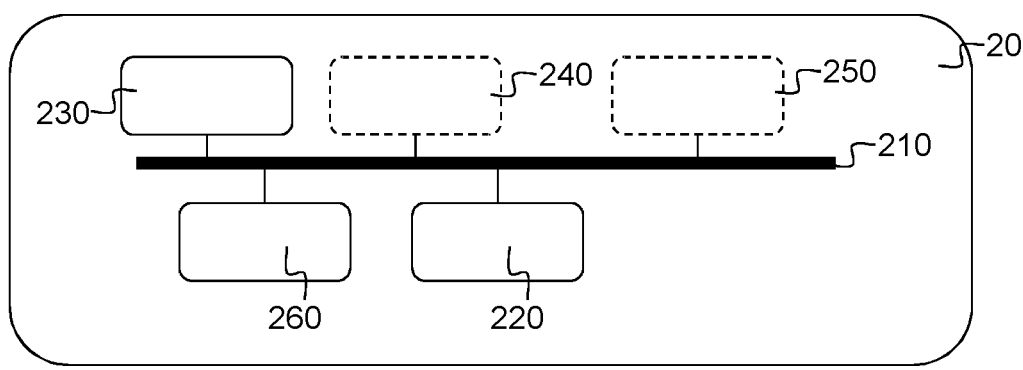
FIG. 3 schematically illustrates a controller node of the distributed object storage system of FIG. 1.

FIG. 3 shows a schematic representation of the controller nodes 20. Controller node 20 may comprise a bus 210, a processor 220, a local memory 230, one or more optional input units 240, one or more optional output units 250. Bus 210 may include one or more conductors that permit communication among the components of controller node 20. Processor 220 may include any type of conventional processor or microprocessor that interprets and executes instructions. Local memory 230 may include a random access memory (RAM) or another type of dynamic storage device that stores information and instructions for execution by processor 220 and/or a read only memory (ROM) or another type of static storage device that stores static information and instructions for use by processor 320 and/or any suitable storage element such as a hard disc or a solid state storage element. An optional input unit 240 may include one or more conventional mechanisms that permit an operator to input information to said controller node 20 such as a keyboard, a mouse, a pen, voice recognition and/or biometric mechanisms, etc. Optional output unit 250 may include one or more conventional mechanisms that output information to the operator, such as a display, a printer, a speaker, etc. Communication interface 260 may include any transceiver-like mechanism that enables controller node 20 to communicate with other devices and/or systems, for example mechanisms for communicating with other storage nodes 30 or controller nodes 20 such as for example two 10 Gb Ethernet interfaces.

According to an alternative embodiment the controller node 20 could have an identical design as a storage node 30, or according to still a further alternative embodiment one of the storage nodes 30 of the distributed object storage system could perform both the function of a controller node 20 and a storage node 30. According to still a further embodiment the device on which the application 10 runs is a controller node 30.

Figure 4:
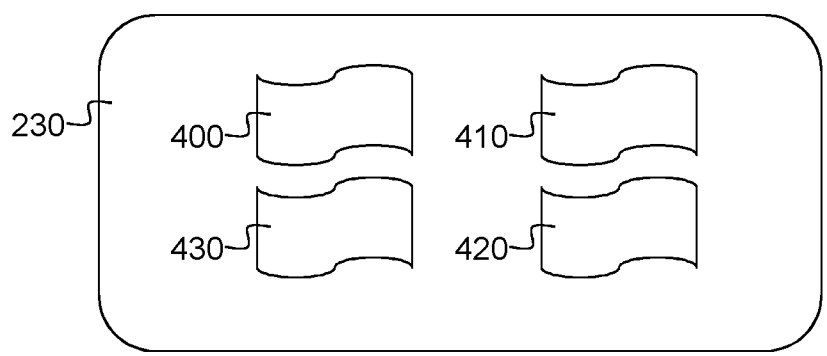
FIG. 4 schematically illustrates some elements of the controller node of FIG. 3 in more detail.

As schematically shown in FIG. 4, controller node 20 comprises four modules: an encoding module 400; a spreading module 410; a clustering module 420; and a decoding module 430. These modules 400, 410, 420, 430 can be implemented as programming instructions stored in local memory 230 of the controller node 20 for execution by its processor 220.

The functioning of these modules 400, 410, 420, 430 will now be explained to FIGS. 5 and 6. The distributed object storage system 1 stores a data object 500 offered by the application 10 in function of a reliability policy which guarantees a level of redundancy. That means that the distributed object storage system 1 must for example guarantee that it will be able to correctly retrieve 500 even if a number of storage elements 300 would be unavailable, for example because they are damaged or inaccessible. Such a reliability policy could for example require the distributed object storage system 1 to be able to retrieve the data object 500 in case of six concurrent failures of the storage elements 300 it comprises. In large scale data storage massive amounts of data are stored on storage elements 300 that are individually unreliable, as such redundancy must be introduced into the storage system to improve reliability. However the most commonly used form of redundancy, straightforward replication of the data on multiple storage elements 300 is only able to achieve acceptable levels of reliability at the cost of unacceptable levels of overhead. For example, in order to achieve sufficient redundancy to cope with six concurrent failures of storage elements 300, data objects 500 would need to be replicated six times and stored on redundant storage elements 300. This means that next to the master copy of a data object 500 stored on one storage element 300, six replica's must be stored on six other storage elements. As such storing 1 GB of data objects in this way would result in the need of 7 GB of storage capacity in a distributed object storage system, this means an increase in the storage cost by a factor of seven or an additional storage overhead of 600%. Therefor the distributed object storage system 1 according to the invention makes use of erasure coding techniques in order to achieve the requirements of the reliability policy with considerably less overhead. As will be explained in further detail below when using an erasure encoding with a rate of encoding r=10/16 six concurrent failures of storage element 300 can be tolerated, which only require a storage overhead of 60% or a storage cost by a factor of 1.6. This means that storing 1 GB of data objects in this way only results in the need of 1.6 GB of storage capacity in the distributed object storage system 1. Some erasure encoding techniques make use of Reed-Solomon codes, but also fountain codes or rateless erasure codes such as online codes, LDPC codes, raptor codes and numerous other coding schemes are available.

Figure 5:
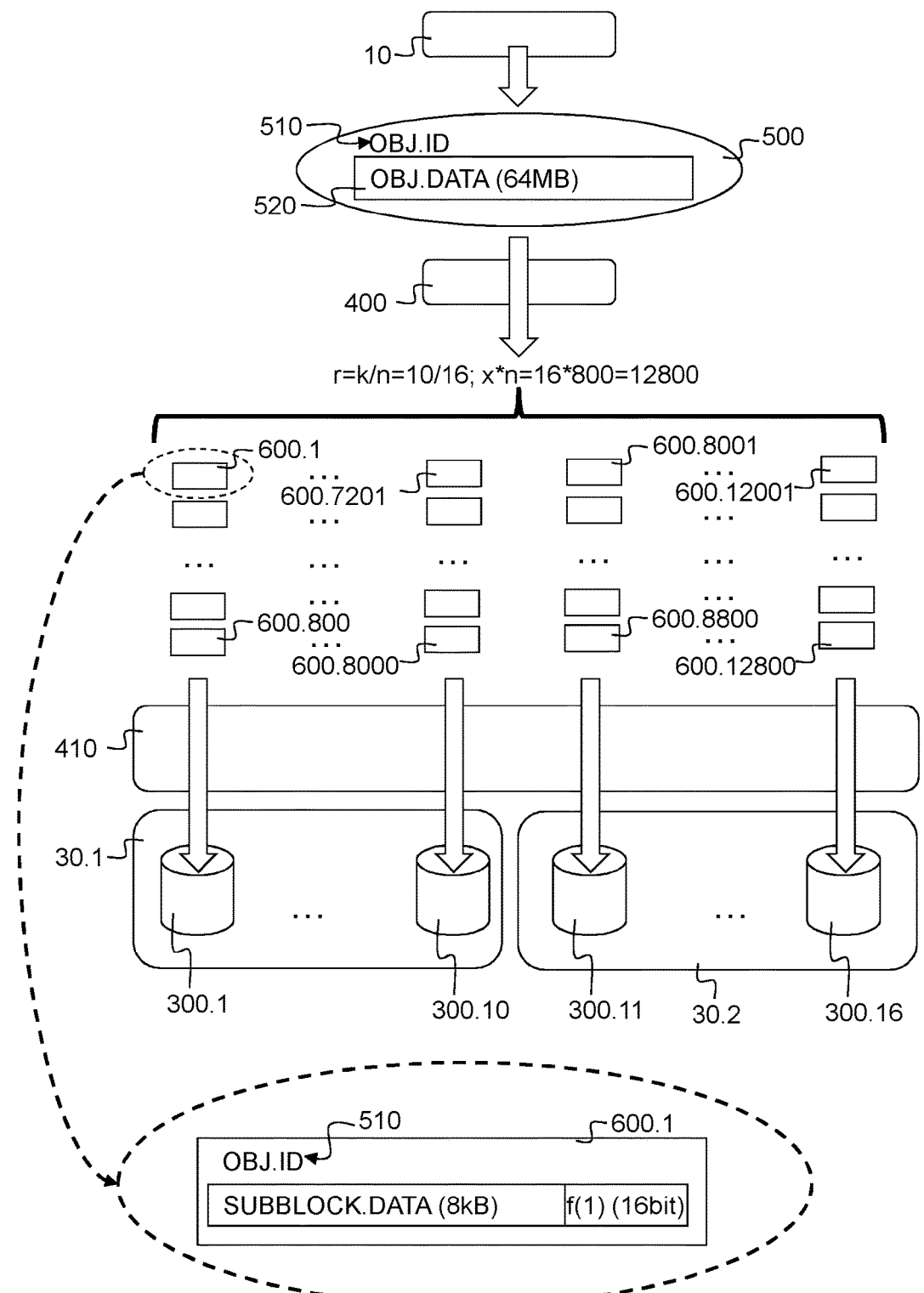
FIG. 5 schematically illustrates a storage operation.

FIG. 5 shows a storage operation performed by an embodiment distributed object storage system 1 that is able to tolerate six concurrent failures of a storage element 300. The data object 500 is offered to the distributed object storage system 1 by the application 10 requesting a storage operation. In this embodiment the data object 500 comprises an object identifier 510, such as for example a GUID, and object data 520, for example consisting of 64 MB of binary data. This data object 500 is offered to the encoding module 400 of the controller node 20. The encoder module 400 will disassemble the data object 500 into a predetermined number x*n=16*800=12800 of redundant sub blocks 600, which also comprise the data object identifier 510. This predetermined number x*n=16*800=12800 corresponds to a predetermined multiple x=800 of a desired spreading width n=16. This desired spreading width n=16=k+f=10+6 consists of the sum of a minimal spreading requirement k=10 and a maximal concurrent failures tolerance f=6. This maximal concurrent failures tolerance f=6 corresponds to the number of storage elements 300 that store sub blocks 600 of said data object 500 and are allowed to fail concurrently as determined by the reliability policy. The minimal spreading requirement k=10, corresponds to the minimal number of storage elements 300 that must store sub blocks 600 of said data object 500 and are not allowed to fail. The encoder module 400 makes use of an erasure encoding scheme to produce these predetermined number x*n=16*800=12800 redundant sub blocks 600.1-600.12800. In this way each one of these redundant sub blocks 600, such as for example sub block 600.1 comprises encoded data of equal size of the data object 500 divided by a factor equal to said predetermined multiple of said minimal spreading requirement x*k=800*10=8000. This means that the size of sub block 600.1 in the example above with a data object of 64 MB will be 8 kB, as this corresponds to 64 MB divided by x*k=800*10=8000. Sub block 600.1 will further comprise decoding data f(1), such that said data object 500 can be decoded from any combination of said redundant sub blocks 600 of which the number x*k=800*10=8000 corresponds to said predetermined multiple x=800 of said minimal spreading requirement k=10. To accomplish this the encoder module 400 will preferably make use of an erasure encoding scheme with a rate of encoding r=k/n=10/16 which corresponds to the minimal spreading requirement k=10 divided by the desired spreading width n=16. In practice this means that the encoder module 400 will first split the data object 500 of 64 MB into x*k=800*10=8000 chunks of 8 kB, subsequently using an erasure encoding scheme with a rate of encoding of r=k/n=10/16 it will generate x*n=800*16=12800 encoded redundant sub blocks 600.1-600.12800 which comprise 8 kB of encoded data, this means encoded data of a size that is equal to the 8 kB chunks; and decoding data f(1)-f(12800) that allows for decoding. The decoding data could be implemented as for example be a 16 bit header or another small size parameter associated with the sub block 600, such as for example a suitable sub block identifier. Because of the erasure encoding scheme used, namely a rate of encoding r=k/n=10/16, the sub blocks 600.1-600.12800 allow the data object 500 to be decoded from any combination of sub blocks 600 which corresponds to the predetermined multiple of the minimal spreading requirement x*k=800*10=8000, such as for example the combination of sub blocks 600.1-600.4000 and sub blocks 600.8001-600.12000. The storage cost of such an erasure coding scheme is inversely proportional to the rate of encoding and in this particular embodiment will be a factor of 1/r=1/(10/16)=1.6. This means that according to this embodiment of the distributed object storage system 1 of the invention 1 GB of data objects 500 will result in a need for a storage capacity of 1.6 GB.

Subsequently, as shown in FIG. 5, the spreading module 410 will store the predetermined number x*n=800*16=12800 of encoded redundant sub blocks 600.1-600.12800 on a number of storage elements 300 which corresponds to said desired spreading width n=16, such as for example storage elements 300.1-300.16. The spreading module 410 will store on each of these storage elements 300.1-300.16 said predetermined multiple x=800 of these sub blocks 600. As shown in FIG. 5 sub blocks 600.1-600.800 are stored on storage element 300.1, the next x=800 of these sub blocks are stored on storage element 300.2 and so on until the last x=800 of these sub blocks 12001-12800 are stored on storage element 300.16. As shown in FIG. 5 storage elements 300.1-300.10 are arranged in storage node 30.1 and storage elements 300.11-300.16 are arranged in storage node 30.2.

According to an alternative embodiment the sub blocks could be spread by the spreading module 410 on a number of storage elements 300 which is larger than said desired spreading width n=16, for example n+1=16+1=17 storage elements 300. This could be implemented by for example storing sub blocks 600.12001-600.12400 on storage element 300.16 and storing sub blocks 600.12401-12800 on storage element 300.16. It is clear that this would still allow for the storage system 1 to cope with f=6 concurrent failures of storage elements 300. Alternative methods for determining the share of sub blocks to be stored on specific storage elements 300 are well known to the person skilled in the art and are for example described in WO2009135630.

It is clear that according to alternative embodiments of the invention other values could have been chosen for the parameters x, f, k, n=k+f and r=k/n mentioned in embodiment above, such as for example x=400, f=4, k=12; n=k+f=12+4=16 and r=12/16; or any other possible combination that conforms to a desired reliability policy for redundancy and concurrent failure tolerance of storage elements 300 of the distributed object storage system 1.

According to still a further alternative there could be provided a safety margin to the number of concurrent failures f that a distributed object storage system 1 needs to be able to cope with. In such an embodiment some of the efficiency is traded in for some additional redundancy over what is theoretically required. This preventively increases the tolerance for failures and the time window that is available for a repair activity. However according to a preferred embodiment this safety margin will be rather limited such that it only accounts for an increase in sub blocks that must be generated and stored of for example approximately 10% to 30%, such as for example 20%.

Figure 6:
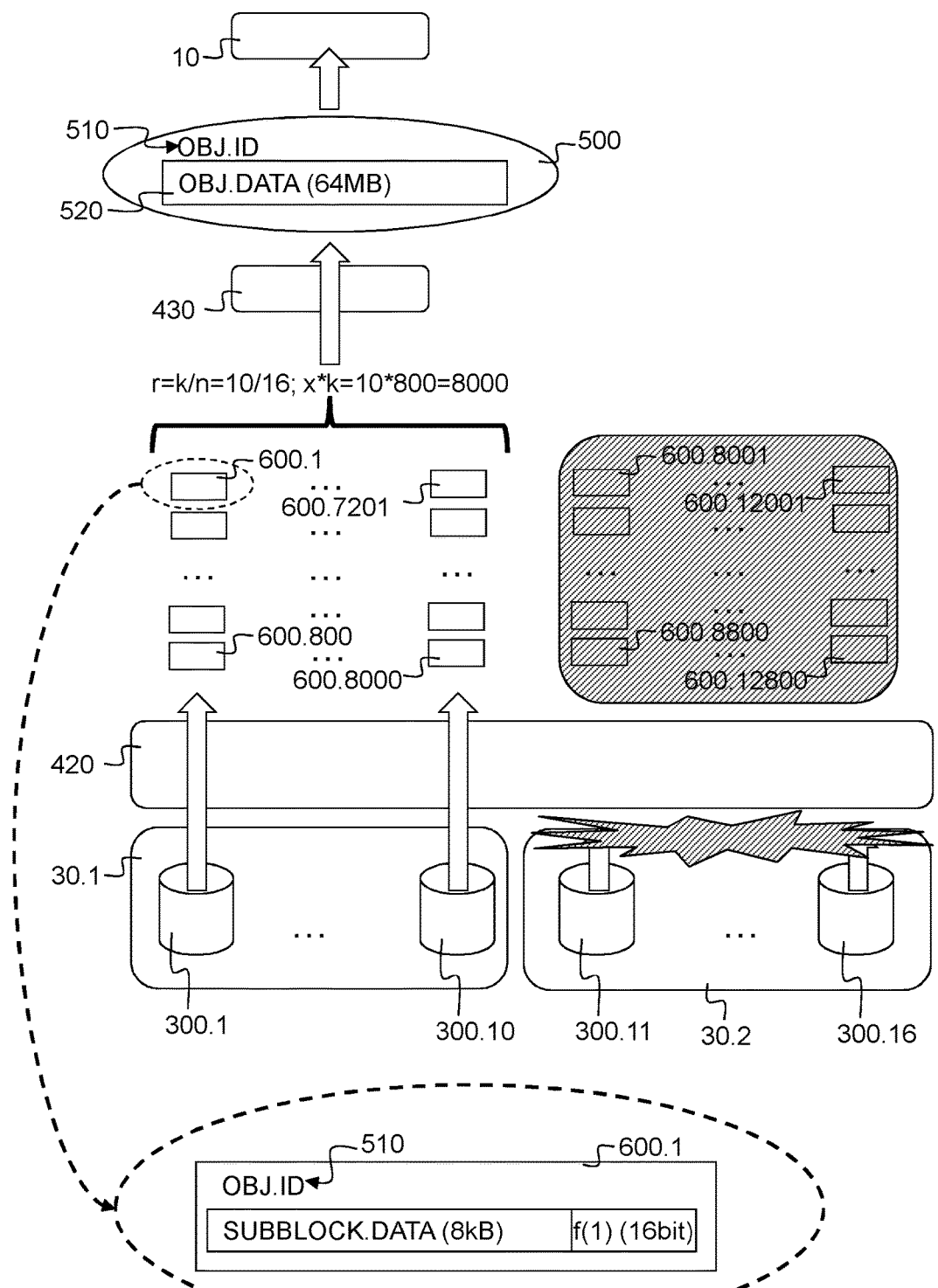
FIG. 6 schematically illustrates a retrieval operation.

FIG. 6 shows a retrieval operation performed by the embodiment of the distributed object storage system 1 as described for the storage operation of FIG. 5 that is able to tolerate six concurrent failures of a storage element 300. The data object 500 is requested from the distributed object storage system 1 by the application 10 requesting a retrieval operation. As explained above, in this embodiment the requested data object 500 can be addressed by its object identifier 510. In response to this request for a retrieval operation the clustering module 520 of the controller node 20 will initiate the retrieval of the sub blocks 600 associated with this data object identifier. It will try to retrieve the predetermined number x*n=16*800=12800 of redundant sub blocks 600.1-600.12800 that were stored on the storage elements 300.1-300.16. Because of the encoding technology used and the corresponding decoding techniques available, it is sufficient for the clustering module 420, to retrieve said predetermined multiple of said minimal spreading requirement x*k=800*10=8000 of said redundant sub blocks 600 from these storage elements 300.1-300.16. This could be the case when for example there is a problem in network connectivity between the controller node 20 and storage node 30.2 as indicated in FIG. 6. In that case the retrieval operation of the clustering module will be able to retrieve the sub blocks 600.1-600.8000 which corresponds to said predetermined multiple of said minimal spreading requirement x*k=800*10=8000. The retrieved sub blocks 600.1-600.8000 allow the decoding module 430 to assemble data object 500 and offer it to the application 10. It is clear that any number in any combination of the redundant sub blocks 600 corresponding to said data object 500, as long as their number is equal to or larger than the predetermined multiple of the minimal spreading requirement x*k=800*10=8000, would have enabled the decoding module 430 to assemble the data object 500.

Figure 7:
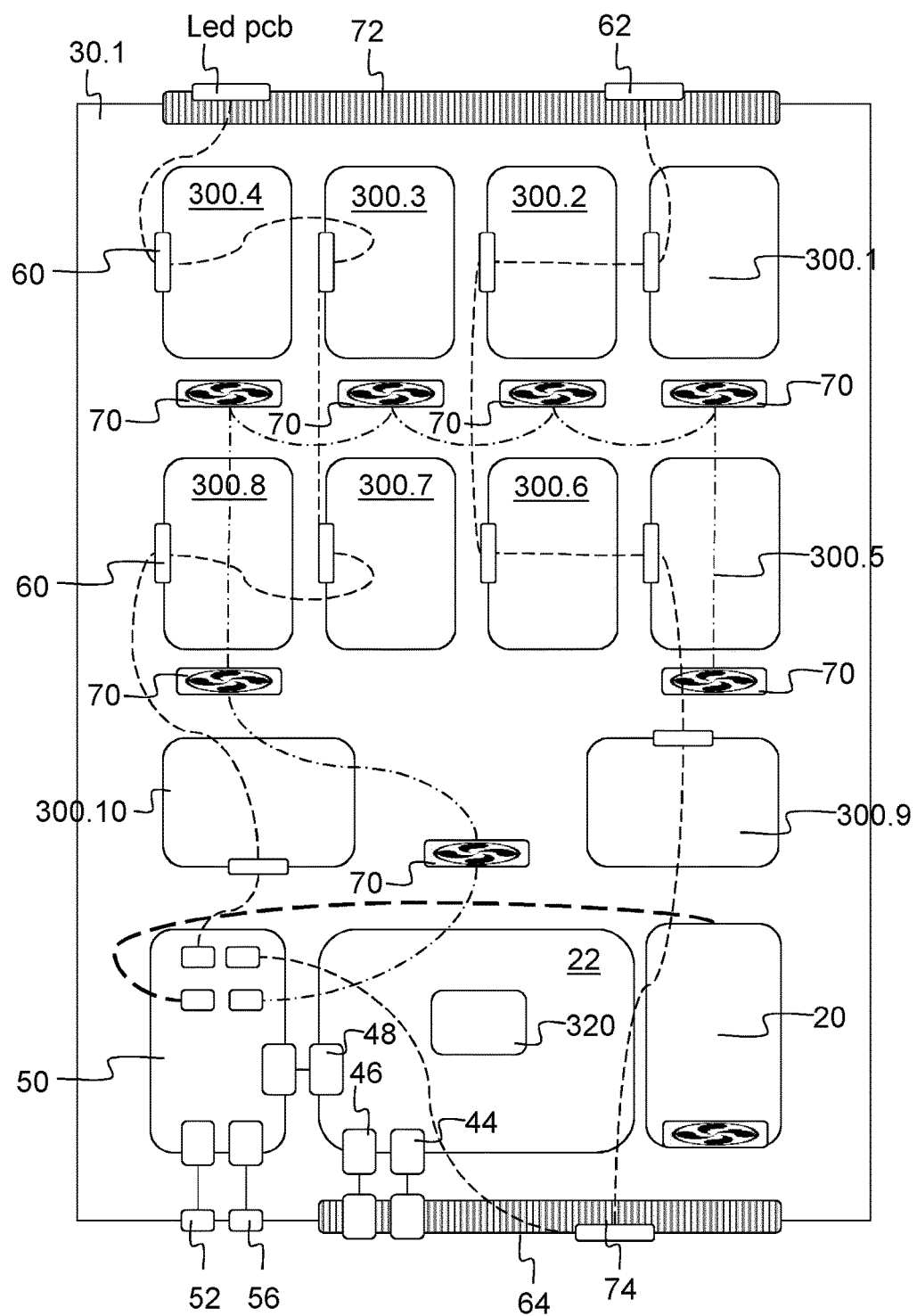
FIG. 7 illustrates the hardware configuration of a storage node of the distributed object storage system according to the invention.
Figure 8:
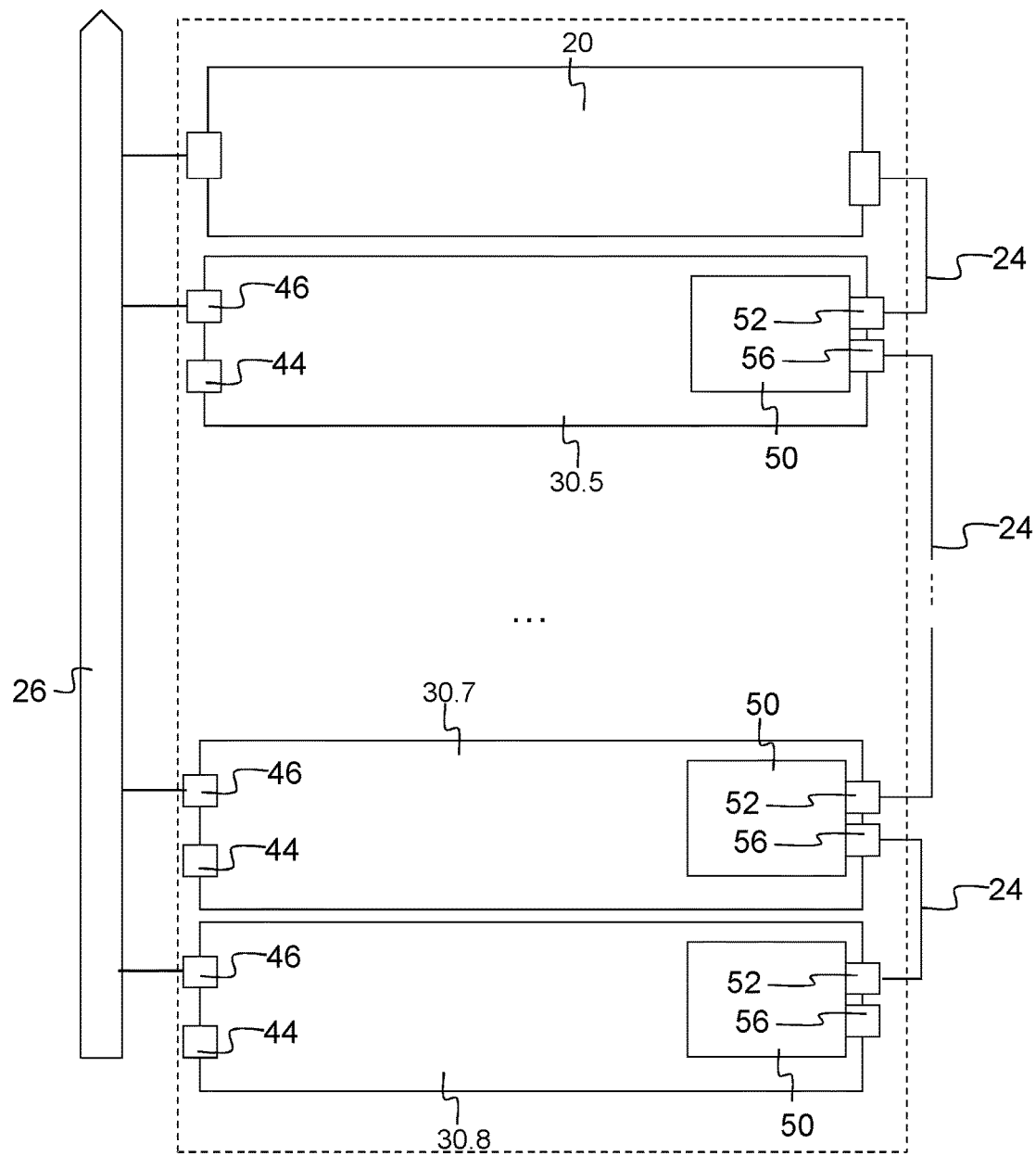
FIG. 8 schematically illustrates a daisy chain topology of multiple storage nodes according to FIG. 7.

As shown in FIG. 7, which shows the hardware of the storage node 30.1 for use in a distributed object storage system 1 in more detail comprises a power supply 28 and ten storage elements 300.1-300.10 powered by said power supply 28. The storage node 30.1 further comprises a motherboard 22 powered by said power supply 28 and connected to said ten storage elements 300. This motherboard 22 comprises a CPU 320, two network interfaces 44 and 46, through which data is transported to said storage elements 300.1-300.10, and a serial port 48 configured for providing access to a serial console of the storage node 30.1, allowing remote access and management. The serial port 48 is connected to a control board 50 which is connected to an incoming serial connector 52 and an outgoing serial connector 54. This allow for connecting multiple storage nodes 30 through a serial bus 24, preferably using a daisy chain topology as illustrated schematically in FIG. 8. Each storage node comprises said incoming serial connector 52 and outgoing serial connector 54 for that purpose. This serial bus 24 does not only allow for a keyboard and video access to the storage node via the serial port 48 of the mother board 22, but also allows for configuration of the storage node 30 in case for example the operating system of the mother board is unavailable or powered down. Therefor this hardware setup is beneficial with reference to a traditional terminal server setup that links directly to the serial console of the motherboard 22. This further also simplifies the physical and logical architecture to get remote management access to a large number of the nodes 30. And it eliminates the need for a KVM system to remotely access the storage node 30.

The main cause of failure of disks is temperature variation. If a disk operates in an environment with frequent temperature variations of over 10 degrees Celsius, then chances for failure of the disk increase considerably. Temperature variations can be caused by external factors such as variations in environment temperature or humidity. Or the variations can be caused by a temporary increase in the workload on the disk.

Therefore, according to the embodiment of the invention shown in FIG. 7, the storage node 30 further comprises several temperature sensors 60 that are bolted on to each of the storage element 300.1-300.10. This allows the temperature to be measured on each of the storage elements 300 individually at regular intervals and to detect temperature variations. Although preferred, it is not required to have a temperature sensor 60 available on every storage element 300, as long as there are sufficient temperature sensors 60, which provide temperature measurements that are sufficiently representative for the temperature of the storage elements 300 of the storage node 30. In some cases even a single temperature sensor 60 could suffice.

The storage node 30.1 shown in FIG. 7 further also comprises an inlet temperature sensor 64 at the air inlet 74 or the storage node and an outlet temperature sensor 62 at the air outlet 72 of the chassis of the storage node 30.1. At the air inlet 74, the temperature of the incoming air is measured. The temperature sensor 72 for the outgoing air is positioned, in the vicinity of the CPU 320, for example behind the CPU heatsink, as this is generally the position where the highest air temperature can be experienced.

According to the embodiment shown in FIG. 7, the temperature sensors 60, 62, 64 are connected via a digital bus system 66 that provides power to these temperature sensors 60, 62, 64 and allows communication of the measurements to the control board 50. This digital bus system 66 enables installing a temperature sensor 60 on each storage element 300, while still keeping the cabling complexity limited. Having less cables also increases the free air space in the system, which enhances airflow and cooling of the storage node 30.1.

The benefit of this detailed temperature measurement is that it allows to reduce temperature fluctuations on the storage elements 300 and as such lengthen the life span of the storage elements 300. Temperature fluctuations can be regulated by regulating for example the fan speeds and airflow in the system. Typical storage nodes have no fan control or control the fan by measuring the temperature of the outgoing air at one point. As shown in FIG. 7 the control board 50 is connected to the fans such that it can control the rotation speed of the fans 70 of the storage node 30 based on temperature measurements of each storage element 300 and of the incoming and outgoing air. Controlling the rotation speed of the fans is further important to limit the power consumption of a node as each fan can consume up to 10 W at full speed. In this way by limiting the fluctuations of temperature on the storage elements 300, the lifespan of these storage elements 300 can be lengthened significantly. Furthermore the control board 50 optionally is also able to assess the rotation speed of the fans 70.

According to the invention the control board 50 can receive a parameter for setting one or more predetermined allowable temperature ranges through said serial port 48 from said controller node 20. Such an allowable temperature range could for example be a range from 30° C. to 50° C., or any suitable range for operating the storage elements 300 within the storage node 30. These allowable temperature ranges could can also be differentiated for each of the individual temperature sensors 60, 62, 64. The allowable temperature range for the inlet temperature sensor 64 could for example be lower than that for the outlet temperature sensor 62. Depending on the position, type and usage of the storage element 300 within the storage node 30 also the allowable temperature ranges for each of their associated temperature sensors 60 could be suitably chosen. The control board 50 will then control the speed of the fans 70 such that these measurements of temperatures remain within said predetermined allowable temperature ranges. Also here depending on the position of the fans 70 the control board can differentiate the speed of the fans 70 in order to achieve this goal. In this way not only the amount of air flow can be regulated, but also the distribution of the airflow within the storage node 30. In this way, for example the airflow can not only be increased, but can also be more efficiently directed to a specific storage element under heavy load of which the temperature is rising. In this way the control board 50 will allow for a more energy efficient operation of the fans 70 which will allow to reduce the overall power consumption of the storage node 30.

If however one or more of the measured temperatures would rise above or below its associated allowable temperature range the control board will send a signal through the serial port 48 to the controller node 20 for indicating that the measurements of temperatures lies outside the predetermined allowable temperature ranges.

This mode of operation in which only the parameters for the allowable temperature ranges and the warning signals for temperatures not within the allowable temperature ranges are to be communicated over the serial bus allow for the distributed object storage system 1 to be scaled up without affecting the performance of the temperature control and the power consumption of the storage nodes 30 without any compromise on the level of flexibility for monitoring and adapting the operation of the storage nodes 30 in this respect.

According to a further embodiment wherein the control board 50 is able to monitor the speed of the fans 70, the control board 50 can be configured by means of setting a predetermined allowable fan speed range in which the control board is allowed to operate the fans. This fan speed range can be chosen so that the power consumption of the fans is limited during operation of the storage node and their operational life is extended. Preferable the parameter for setting one or more of these predetermined allowable fan speed ranges, which optionally may be differentiated for each fan, is received as a parameter through said serial port 48 from said controller node 20. If one of the fans needs to be operated outside of its allowable fan speed range, for example because a storage element 300 risks being operated outside its allowable temperature range, then the control board 50 will send a signal through said serial port 48 for indicating that this fan speed measurement lies outside the predetermined allowable fan speed range to the controller node 20.

According to an embodiment of the invention the design of the power supply 28 of the storage nodes 30 allows the storage elements 300 to be individually put in idle power mode or even completely powered down. This functionality allows to carefully manage the power consumption of a storage node 300 by putting specific storage elements 300 in idle or by cutting power to specific storage elements 300. This can lead to a radical reduction in power consumption. Each storage element typically consumes 5-10 W of power. For an embodiment of a storage node 30 with then storage elements 300 in its chassis, this means a power consumption of less than 140 W under full load. Powering down these storage elements 300 will reduce the power consumption of the storage node 30 by 100 W or 70%. In order to do this the power supply 28 is connected to the control board 50 and the control board can be configured with a parameter for controlling the switching on or off of the storage elements 300 through the serial port 48 from the controller node 20. Additionally the control board 50 will send a signal through the serial port 48 for indicating which of said storage elements 300 is switched on or off to the controller node 20. In this way the status of the storage elements 300 can be assessed without activating them, which in the case of hard disks means without spinning them up, which limits power consumption of the storage node 30 and extends the life span of the storage elements 300.

Traditional computers and storage systems contain power supplies that are typically over-dimensioned to resist power surges, specifically while powering on the system or at occasional peak loads. Because of that, the load on the power supply is typically 50% or less of the specified maximum load of the power supply.

According to a still further optimized embodiment of the invention there are provided storage nodes 300 which avoid power surges and load the power supply 28 close to its specified maximum power delivery. In order to avoid a current surge at startup, the control board 50 can be configured by means of setting a parameter to instruct the power supply 28 to power on the storage elements 300 sequentially or in sequential groups, allowing them to spin up sequentially instead of all at once which will limit the power surge during startup. Optionally this parameter for controlling the switching on or off of the storage elements 300 configures the control board 50 to instruct the power supply 28 to execute the powering up or down of said storage elements 300 in function of said temperature measurements and said allowable temperature ranges. This allows for example to switch off storage elements 300 that get too hot and switching them back on when they have sufficiently cooled down.

The benefit of dimensioning the power supply 28 smaller to load it closer to its maximum specified load is that modern power supplies work most efficiently when they are loaded close to their specified maximum power delivery. There is thus less unnecessary power dissipation, resulting in a more optimal power usage.

The additional benefit is that in the storage node 30, the power supply 28 is dimensioned to deliver just about enough power to power all components. Which results in a reduction in cost of the power supply and typically also in a reduction of the size of the power supply.

Most traditional storage controllers use high speed CPU's which consume in the order of 70-100 W. However according to an embodiment of the invention the storage nodes 30 comprise a low power CPU 320 and combines this with distributing the load over a large number of storage nodes 30. Typical CPU's that can be used are for example Intel's Atom processor, ARM (Acorn RISK Machine) processors, or equivalent low power CPU's that typically consume power below 15 W. The direct benefit of using a low power CPU is the reduction in power consumption per storage node 30, and per TB usable capacity. The additional benefit of using a low power CPU is that the CPU can be cooled using a passive cooling heatsink, without a fan. By positioning this heatsink with its fins in the airflow generated by the fans 70 of the storage node 30, it will be able to dissipate its heat to the back of the storage node 30. While not having a fan on the heatsink reduces power consumption and enhances the reliability of the storage node 30.

Typical storage systems have hot swap storage elements that are front or back accessible. This is because a storage element failure in a traditional storage system requires immediate attention. In a distributed object storage system according to the invention however, the failure of a storage element is managed by the encoding technology of the controller node 20 or the storage nodes 30 as explained above. Therefore, storage elements 300 do not need to be replaced immediately. It might even decide to keep using a storage node 30 of the distributed object storage system 1 even when one or more of the storage elements 300 have failed.

According to a further embodiment of the distributed object storage system according to the invention, the storage elements 300 are not front mounted, but rather they are mounted fixed in the inside of the chassis of the storage node 30 to make maximum usage of the available space in the chassis. This results in the benefit that extremely high density is achieved for the storage system. For example ten standard 3.5" storage elements can be mounted in a single 1 U (one industry standard rack unit) storage node 30 of one rack depth.

As explained above the controller node 20 of the distributed object storage system 1 that is connected to the storage nodes 30 by means of said serial bus 24 as explained above will send parameters for setting said predetermined allowable temperature ranges to the controller boards 50 of the respective storage nodes and receive said signals for indicating that one or more of the measurements of temperatures lies outside said predetermined allowable temperature ranges from these controller boards 50. Preferably it is also able to send parameters for setting one or more predetermined allowable fan speed ranges to these control boards 50; and receive signals for indicating that one or more of said fan speed measurements lies outside their predetermined allowable fan speed ranges. Further it is also beneficial if it can send parameters for controlling the switching on or off of specific storage elements 300 of the storage node; and receive signals for indicating which of the storage elements 300 is switched on or off. This will then enable the distributed object storage system 1 by means of its spreading module 410 to control continuation or discontinuation of usage of one or more of the storage elements 300 on the basis of these signals. According to one example a storage element 300 could be discontinued from usage is if for example its signal for indicating that its measurement of temperatures lies outside its predetermined allowable temperature ranges. According to a further example the usage of a storage element 300 could be continued if for example its signal for indicating if it is switched on indicates it is switched on. All of this can be accomplished in a scalable manner as the control board 50 of each storage node 30 will continuously and with low latency check the status of the storage node 30 and only send signals to the controller node 20 when necessary.

Traditional storage systems with RAID protection technologies require all storage elements to be spinning at all times. This results in a constant high power consumption, even when the data on the storage elements is not frequently accessed. The above mentioned configuration allows the distributed object storage system 1 to assess which of the storage elements 300 needs to be available at any time. Similarly, the distributed object storage system 1 incorporates the flexibility to determine automatically which storage element can be powered off, e.g. for storage elements that only store redundant data, or storage elements that contain rarely used data.

If these control measures would not be sufficient to avoid extreme temperature fluctuations, then these temperature measurements can give a good indication about which storage elements would potentially fail first. The distributed object storage system according to the invention can then benefit from this information as it can take precautions to for example increase the reliability policy for the data that is stored on this storage element 300, or even more radically; discontinue using the storage element before it actually breaks down as explained above.

According to still a further embodiment the distributed object storage system 1 by means of its spreading module 410 will enable to adapt the selection of said storage elements 300 in order to distribute the storage load across the storage elements 300 on the basis of the signals for indicating that one or more of the measurements of temperatures lies outside the predetermined allowable ranges and/or the signals for indicating which of the storage elements 300 is switched on or off. In this way the spreading module 410 will be able to adapt is spreading policy for selecting suitable storage elements 300 to a number of possible scenarios in a scalable way in order to for example reduce power consumption or robustness of the distributed object storage system 1 as a whole or of one or more specific storage elements 300 by regulating and distributing the data load. According to one scenario the spreading policy could be set to balance the storage load evenly over a as many storage nodes 30 as possible in order to keep the power consumption of the fans within control, but according to an alternative scenario the spreading policy could be set to keep as many storage elements 300 that are in the switched off state in this switched off state.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

What is claimed is:

1. A storage node, comprising:
    a plurality of storage elements configured to store data;
    a plurality of temperature sensors distributed among the plurality of storage elements to measure temperatures of at least a share of the plurality of storage elements; and
    a controller node configured to:
        disassemble a data object into a plurality of sub blocks based on a desired spreading width indicating a first number of storage elements over which to spread storage of at least a portion of the sub blocks of the data object;
        identify specific storage elements from at least the share of the plurality of storage elements based on the temperatures measured by the plurality of temperature sensors; and
        store the plurality of sub blocks in the specific storage elements.

2. The storage node according to claim 1, further comprising:
    a communication interface to connect to a data communication network,
    wherein the controller node is further configured to receive the data object via the communication interface.

3. The storage node according to claim 2, wherein the controller node is further configured to send, via the communication interface, a share of the plurality of sub blocks to other storage nodes connected to the data communication network.

4. The storage node according to claim 3, wherein the controller node is further configured to:
    identify the other storage nodes based on the temperatures measured by the plurality of temperature sensors and temperature measurements received from the other storage nodes.

5. The storage node according to claim 1, further comprising:
    a plurality of fans distributed among the plurality of storage elements,
    wherein the controller node is further configured to individually adjust speeds of the fans to regulate the distribution of airflow to one or more of the plurality of storage elements based on the temperatures measured by the plurality of temperature sensors.

6. The storage node according to claim 5, wherein the controller node is further configured to maintain the temperatures of the plurality of storage elements within a predetermined allowable temperature range by controlling the speeds of the fans.

7. The storage node according to claim 6, wherein the controller node is further configured to discontinue usage of a storage element having a temperature that exceeds the predetermined allowable temperature range.

8. The storage node according to claim 1, wherein the plurality of temperature sensors are coupled to the plurality of storage elements using a single digital bus to power the plurality of temperature sensors and to transfer the measured temperatures.

9. The storage node according to claim 1, wherein the desired spreading width is a sum of:
    a spreading requirement indicating a second number of storage elements storing the sub blocks of the data object that are not allowed to fail; and
    a concurrent failure tolerance indicating a third number of storage elements storing the sub blocks of the data object that are allowed to fail concurrently without causing data loss.

10. The storage node according to claim 1, further comprising:
    a power supply to selectively power, under control of the controller node, at least the plurality of storage elements,
    wherein the controller node is further configured to cause the power supply to sequentially power the plurality of storage elements to reduce a power surge at the power supply.

11. The storage node according to claim 10, wherein the controller node is further configured to cause the power supply to power down a given storage element responsive to the temperatures measured by the temperature sensors indicating that a temperature of the given storage element exceeds a predetermined allowable temperature range.

12. The storage node according to claim 2, wherein the controller node is further configured to:
    receive, from a second storage node and via the communication interface, sub blocks corresponding to another data object; and
    store the sub blocks corresponding to the other data object in the plurality of storage elements under control of the second storage node.

13. The storage node according to claim 3, wherein the controller node is further configured to send the share of the plurality of sub blocks to the other storage nodes based on a policy to evenly distribute the plurality of sub blocks among the storage node and the other storage nodes.

14. The storage node according to claim 3, wherein the controller node is further configured to send the share of the plurality of sub blocks to the other storage nodes in such a way that storage elements of the plurality of storage elements, which are in a switched off state, are kept in the switched off state.

15. The storage node according to claim 1, wherein each of the plurality of temperature sensors is arranged on a respective one of the plurality of storage elements.

16. A method, comprising:
- measuring temperatures of at least a share of a plurality of storage elements using a plurality of temperature sensors distributed among the plurality of storage elements;
- disassembling a data object into a plurality of sub blocks based on a desired spreading width indicating a first number of storage elements over which to spread storage of at least a portion of the sub blocks of the data object;
- identifying specific storage elements from at least the share of the plurality of storage elements based on temperatures measured by the plurality of temperature sensors; and
- storing the plurality of sub blocks in the specific storage elements.

17. The method of claim 16, further comprising sending, via a communication interface, a share of the plurality of sub blocks to other storage nodes connected to a data communication network.

18. The method of claim 17, further comprising identifying the other storage nodes based on the temperatures measured by the plurality of temperature sensors and temperature measurements received from the other storage nodes.

19. A storage node, comprising:
- means for measuring temperatures of at least a share of a plurality of storage elements;
- means for disassembling a data object into a plurality of sub blocks based on a desired spreading width indicating a first number of storage elements over which to spread storage of at least a portion of the sub blocks of the data object;
- means for identifying specific storage elements from at least the share of the plurality of storage elements based on temperatures measured by the means for measuring temperatures; and
- means for storing the plurality of sub blocks in the specific storage elements.

20. The storage node of claim 19, further comprising:
- means for identifying other storage nodes based on the temperatures measured by the means for measuring temperatures and temperature measurements received from the other storage nodes; and
- means for sending a share of the plurality of sub blocks to the other storage nodes.

* * * * *